3,630,924
PREPARATION CONTAINING DEXTRANASE
Glendon Richard Miller, Basking Ridge, N.J., assignor to Colgate-Palmolive Company, New York, N.Y.
No Drawing. Filed Jan. 23, 1969, Ser. No. 793,577
Int. Cl. C11d 7/54
U.S. Cl. 252—100                    5 Claims

ABSTRACT OF THE DISCLOSURE

This disclosure relates to stable effervescent denture soak compositions containing dextranase particularly useful in reducing dental plaque.

---

The present invention relates to a stable, effervescent denture soak preparation containing dextranase.

The art is replete with effervescent denture soak formulae; some of which contain oxidizing agents as the source of effervescence, others comprising a carbonate as the source of carbon dioxide liberation, and still others utilizing both an oxidizing agent and carbonation agents (a carbonate plus an acid capable of reacting to release carbon dioxide) in a single composition.

While prior art denture soak formulations were effective as cleansers, the accumulated plaque resisted removal. Even the cumbersome act of brushing the dentures was ineffective in completely removing the plaque which formed on all parts of the dentures.

Accordingly, it is an object of this invention to provide a stable dental soak product capable of removing and/or reducing the incidence of plaque.

It has now been found that a stable effervescent denture soak product capable of reducing dental plaque when dissolved in water can be formulated by the addition of dextranase to a composition comprising an oxidizing agent, an inorganic carbonate, and an organic acid. The inorganic carbonate reacts with the organic acid to release carbon dioxide which effervesces in an aqueous medium simultaneously with the evolution of oxygen from the oxidizing agent releasing the dextranase to attack the dextran which forms the foundation of dental plaque. Cessation of effervescence does not signify completion of enzymatic activity which requires long periods of exposure at suitable pH. Accordingly, the dentures are preferably soaked overnight at a slightly acid pH, preferably at a pH of 5–5.5. These novel denture soak formulations must be stable over a long period of time and yield an aqueous solution of slightly acid pH for optimum enzymatic stability and activity.

More specifically, this invention relates to a stable, non-deliquescent water soluble effervescent solid composition of slighly acid pH when dissolved in an aqueous medium comprising a solid water soluble oxidizing agent, a solid water soluble carbonate compound, a solid anhydrous water soluble organic acid and dextranase.

Dextranase is an enzyme material which is effective in reducing the incidence of dental plaque and may be prepared from a mold grown in a medium containing dextran, in the manner described by Bowen, "British Dental Journal," vol. 124, No. 8, April 16, 1968, pages 347–349. Briefly, dextran may be prepared from non-cariogenic streptococcal strains such as ATCC 10558, 903–1600, IIA2+3 or *Leuconostoc mesenterioides* and purified according to the method described by Wood et al., "Archives of Oral Biology," vol. 11, 1966, pages 1039 et seq., except that *L. mesenterioides* is grown at 25° C.

Dextranase may also be prepared from dextran by inoculating *Penicilliu mfuniculosum* into flasks containing 250 ml. of a medium containing 0.5% yeast extract and 1% dextran. The flasks are incubated at 30° C. on a shaking incubator for 4 days. The culture is then centrifuged at 3000 g. for 20 minutes and filtered through Whatman 42 filter paper. Dialysis in 16 mm. "Visking" tubing against deionized water and concentrating fiftyfold by dialysis against polyethylene glycol (molecular weight 20,000) follows. The dextranase produced in accordance with this procedure has a molecular weight of about 200,000–275,00. If desired, the dextranase may be further purified by fractionation with ammonium sulfate.

A further method for preparing dextranase is described in U.S. Pat. 2,742,399 to Tsuchiya et al.

The amount of dextranase employed in the oral preparation of the invention is at least such amount as is effective in promoting oral hygiene. This amount is dependent upon the activity of the dextranase and therefore upon the mode of its preparation. A typically prepared dextranase enzyme material has an activity of 800 units/mg. where 1 unit is the amount of enzyme which produces 1 mg. equivalent of isomaltose monohydrate in 1 hour at 40° C. at pH 5.1 on 2.5% dextrose (Note Tsuchiya et al., Journal of Bacteriology, vol. 64, page 513).

While smaller amounts of dextranase may be used, a dextranase enzyme material such as that described above may be present in amounts of about 0.001%–5% by weight of the denture soak preparation, preferably about 0.05%–2% and most preferably about 1.0%. The amounts refer to the amount of dextranase in the material. The material is generally in crude form.

The efficacy of the dextranase containing product is attributed to its ability to degrade microbially produced extra-cellular polysaccharides of the dextran type which are present in plaque matrix. During the course of the day, micro organisms in the mouth colonize the dentures and build dextran which forms the basis for dental plaque. The instant product is particularly effective in reducing the incidence of plaque and protecting the dentures against decay.

The source of carbon dioxide is a water soluble alkalimetal carbonate compound selected from the group consisting of sodium bicarbonate, sodium carbonate, sodium sesquicarbonate, potassium carbonate, potassium bicarbonate, and mixtures thereof, which reacts with a solid non-toxic organic acid selected from the class consisting of tartaric acid, citric acid, malic acid, maleic acid, fumaric acid, succinic acid, adipic acid, etc. and mixtures thereof, in the presence of water to produce effervescence (bubbles). The carbonate content and acid content may each vary from about 5–50% and preferably 10–30% by weight of the total composition.

It is preferable to utilize anhydrous acids to preserve shelf stability of the dry formulation and to prevent premature carbon dioxide evolution prior to its dissolution in water.

The oxidizing agents offer another source of effervescence (liberation of oxygen) and are preferably the persalts such as the alkali metal perborates, persulfates, percarbonates, perphosphates and the like. The simple addition of these water soluble peroxygen compounds to water produces a highly effective effervescent flow of active oxygen which is particularly useful in oxidation reactions, thereby providing considerable improvements in applications where peroxygen compounds are employed such as for antiseptic, cleansing and bleaching activity. The degree of effervescence which relates to both the volume and speed is dependent on the particular peroxygen compound employed. For example, sodium perborate has three times as much active oxygen as potassium persulfate, but the latter has a stronger oxidation potential (stronger oxidizing agent, and is less effected by moisture. Consequently, it may be preferable to use a mixture of persalts in order to obtain the combined advantages of both oxidizing agents. The total amount of oxidizing agents utilized therein may vary from 5-50% and preferably 10-30% by weight of the total composition, the distribution between the various agents being dependent on the desired end result. More specifically, a composition having less active oxygen but yielding stronger oxidizing action will utilize a greater amount of the persulfate salt, whereas a formulation requiring a greater and quick release of active oxygen will employ a greater amount of the perborate. Other suitable solid per-oxygen compounds include ammonium persulfate, sodium persulfate, sodium pyrophosphate peroxide, sodium carbonate peroxide, etc.

The denture soak composition may also contain any suitable surface-active or detersive material to enhance its cleaning activity. Suitable detergents are water soluble nontoxic salts of higher fatty acid monoglyceride, monosulfate, higher alkyl sulfate, alkyl aryl sulfonate, higher alkyl sulfoacetate, higher fatty acid ester of 1,2 dihydroxy propane sulfonate, higher fatty acid amides of taurine and higher fatty acid esters of isothionic acid; the substantially saturated highed aliphaitc acyl amides of lower aliphatic amino carboxylic acid compounds, such as those having 12 to 16 carbons in the acyl radical, and the like. Examples of such amides are N-lauroyl, myristoyl or palmitoyl sarcosides. The various surface-active materials should be used in a suitable amount such as up to about 5%, preferably from about 0.1 to 5% by weight of the denture soak preparation.

Various other adjuvant materials may also be incorporated in the present denture soak preparations. Water soluble halides such as sodium chloride may be added which provide a source of free halogen in aqueous solution for additional oxidizing and cleaning effects. Minor amounts of flavor oils such as oils of spearmint, peppermint and wintergreen may be included to impart a mild and pleasant flavor and odor to the cleaned denture. However, when adding a flavor oil in amounts not exceeding 0.25%, it has been found desirable to also incorporate minor amounts about 1-5% of a flavor retainer or carrier such as magnesium carbonate to avoid the separation of the oil droplets from the rest of the dry composition. Other flavor retainers may be utilized provided they readily absorb the flavor oils and prevent flavor weeping. Minor amounts of other suitable water soluble additives may be included such as sweeteners, foam depressants, preservatives, buffers, fillers, diluents, binders, etc., provided they do not adversely affect the properties and charactertistics of the denture soak product.

The denture cleansing compositions of the instant invention are dry, water soluble powders or granules which may be packaged in bulk in assorted containers or in individual premeasured packets. The product may also be marketed in the form of tablets. It is essential that aforesaid product completely dissolve in water to yield a clean solution having a mildly acid pH, preferably pH 5.0-5.5 for maximum enzymatic activity and stability for the proper cleansing of dentures. An alkaline solution has the disadvantage of hastening the corrosion of metal parts of the dentures, whereas strongly acid solutions tend to etch the dentures.

The term denture includes all kinds of orthodontic appliances such as false teeth, removable dental plates and bridges, artificial teeth and the like.

The following specific example is further illustrative of the nature of the present invention, but it is to be understood that the invention is not limited thereto. The compositions are prepared in the usual manner as indicated, and all amounts of the various ingredients are by weight unless otherwise specified.

EXAMPLE I

| Ingredients: | Percent by weight |
|---|---|
| Adipic acid, anhydrous | 20.0 |
| Potassium persulfate, anhydrous | 20.0 |
| Bicarbonate of soda | 20.0 |
| Sodium lauryl sulfate | 0.5 |
| Sodium chloride | 38.5 |
| Dextranase | 1.0 |

The above ingredients are thoroughly mixed and blended to produce a homogeneous powdered mixture which is stable. A denture is immersed in 200 ml. of water containing 4 grams of the above product which effervesces and has a pH of 5.0-5.5. After soaking overnight, the denture is bright, clean, odorless and substantially free of dental plaque.

It is understood that the foregoing detailed description is given merely by way of illustration and that variations may be made therein without departing fiom the spirit of the invention. The "Abstract" given above is merely for the convenience of technical researchers and is not to be given any weight with respect to the scope of the invention.

What is desired to be claimed is:

1. A stable, non-deliquescent, water-soluble, effervescent solid denture soak composition of about pH 5 to 5.5 when dissolved in an aqueous medium, consisting essentially of from 5 to 50% by weight of a water-soluble alkali metal carbonate, from 5 to 50% by weight of a solid non-toxic water soluble organic acid, from 5 to 50% by weight of an inorganic peroxygen compound and from 0.001 to 5% by weight of dextranase.

2. A composition in accordance with claim 1 wherein the organic acid constitutes 10 to 30% by weight of the total composition.

3. A composition in accordance with claim 1 wherein the water soluble carbonate constitutes about 10 to 30% by weight of the total composition.

4. A composition in accordance with claim 1 wherein the peroxygen compound constitutes about 10 to 30% by weight of the total composition.

5. A composition in accordance with claim 1 which also contains 0.1 to 5% by weight of a non-toxic water soluble surface active salt.

References Cited

UNITED STATES PATENTS

| 2,931,776 | 4/1960 | Howard | 252—99 |
| 3,105,792 | 10/1963 | White | 424—50 |
| 3,243,377 | 3/1966 | Stolar et al. | 252—100 |
| 2,498,343 | 2/1950 | Rider et al. | 252—99 X |

OTHER REFERENCES

Bowen "British Dental Journal" vol. 124, No. 8, Apr. 16, 1968, pp. 347-348.

Fitzgerald et al., "Effects of Dextranase on Caries," Jada, vol. 76, February 1968, pp. 301-303.

MAYER WEINBLATT, Primary Examiner

U.S. Cl. X.R.

252—95, 99; 424—50